United States Patent
Childs et al.

(10) Patent No.: US 8,393,459 B2
(45) Date of Patent: Mar. 12, 2013

(54) CONVEYOR BELT SCRAPER ASSEMBLY COMPRISING SCRAPER MEMBERS THAT ARE CLAMPED TOGETHER AND METHOD PERTAINING TO THE SAME

(75) Inventors: Adam F. Childs, Annawan, IL (US); Andrew C. Timmerman, Geneseo, IL (US)

(73) Assignee: Martin Engineering Company, Neponset, IL (US)

( * ) Notice: Subject to any disclaimer, the term of this patent is extended or adjusted under 35 U.S.C. 154(b) by 0 days.

(21) Appl. No.: 13/193,082

(22) Filed: Jul. 28, 2011

(65) Prior Publication Data
US 2013/0026008 A1   Jan. 31, 2013

(51) Int. Cl.
*B65G 45/12* (2006.01)
(52) U.S. Cl. .......... 198/497; 198/498; 198/499
(58) Field of Classification Search ......... 198/497, 198/498, 499
See application file for complete search history.

(56) References Cited

U.S. PATENT DOCUMENTS

| | | | | |
|---|---|---|---|---|
| 4,489,823 A | * | 12/1984 | Gordon | 198/499 |
| 4,768,644 A | * | 9/1988 | Cromm | 198/499 |
| 4,825,996 A | | 5/1989 | Davidts | |
| 4,825,997 A | * | 5/1989 | Bowman et al. | 198/499 |
| 5,011,002 A | | 4/1991 | Gibbs | |
| 5,016,746 A | * | 5/1991 | Gibbs | 198/499 |
| 5,201,402 A | * | 4/1993 | Mott | 198/499 |
| 5,301,797 A | | 4/1994 | Hollyfield, Jr. et al. | |
| 6,182,816 B1 | | 2/2001 | Gibbs et al. | |
| 6,296,105 B1 | | 10/2001 | Carnes | |
| 6,315,105 B1 | | 11/2001 | Gibbs et al. | |
| 6,457,575 B2 | | 10/2002 | Swinderman | |
| 6,581,754 B2 | | 6/2003 | Law | |
| 6,860,382 B2 | * | 3/2005 | Wiedenheft | 198/813 |
| 6,948,609 B2 | * | 9/2005 | Finger et al. | 198/499 |
| 6,991,088 B1 | * | 1/2006 | Smith et al. | 198/499 |

(Continued)

FOREIGN PATENT DOCUMENTS

BE  895740 A1  5/1983
EP  0153527  9/1985

(Continued)

OTHER PUBLICATIONS

Product Brochure of Montering Flexus 2 9750, Vendig AB, 2008, 2 pages.

(Continued)

*Primary Examiner* — Douglas Hess
(74) *Attorney, Agent, or Firm* — Thompson Coburn LLP; Clyde L. Smith

(57) ABSTRACT

A bulk material conveyor belt scraper assembly comprises a support member, at least two scraper members, and a clamping device. The support member has a length that extends along an axis. The scraper members each have a first end portion and an opposite second end portion. The first end portion of each of the scraper members is configured and adapted to engage a bulk material conveyor belt. The second end portion of each of the scraper members connects the scraper member to the support member in a manner such that the scraper member is slidable relative to the support member along the axis of the support member and is otherwise fixed relative to the support member. The clamping device is secured to the support member and is configured and adapted to squeeze the scraper members toward each other relative to the axis of the support member.

14 Claims, 7 Drawing Sheets

U.S. PATENT DOCUMENTS

| | | | |
|---|---|---|---|
| 7,004,304 B1 * | 2/2006 | Smith et al. | 198/499 |
| 7,093,706 B2 * | 8/2006 | DeVries et al. | 198/499 |
| 7,308,980 B2 | 12/2007 | Peterson et al. | |
| 7,367,443 B2 * | 5/2008 | Swinderman | 198/497 |
| 7,424,945 B2 | 9/2008 | Swinderman | |
| 7,565,962 B2 * | 7/2009 | Thew | 198/497 |
| 7,987,966 B2 * | 8/2011 | DeVries et al. | 198/497 |
| 8,061,508 B2 * | 11/2011 | Metzner | 198/497 |
| 8,167,114 B2 * | 5/2012 | Khanania | 198/499 |
| 8,245,836 B2 * | 8/2012 | Kotze | 198/499 |
| 8,312,986 B2 * | 11/2012 | DeVries et al. | 198/497 |

FOREIGN PATENT DOCUMENTS

| | | |
|---|---|---|
| EP | 0252188 A2 | 1/1988 |
| EP | 1036748 A2 | 9/2000 |
| EP | 1666388 A1 | 6/2006 |
| GB | 2055730 A | 3/1981 |
| WO | 2007043944 A1 | 4/2007 |
| WO | 2010/029482 | 3/2010 |

OTHER PUBLICATIONS

Product Catalog, Flexus 2 9750, Vendig, 2008-2009, 1 page.

* cited by examiner

CONVEYOR BELT SCRAPER ASSEMBLY COMPRISING SCRAPER MEMBERS THAT ARE CLAMPED TOGETHER AND METHOD PERTAINING TO THE SAME

CROSS-REFERENCE TO RELATED APPLICATIONS

Not Applicable

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention pertains to bulk material conveyor belt scraper assemblies. More particularly the invention pertains to a scraper assembly comprising a plurality of scraper members that are clamped to each other along the axis of a support member that holds the scraper members.

2. General Background

Bulk material conveyor belt systems often comprise belt scraper assemblies that are configured to remove bulk material carryback from the belt. In some cases, it is preferable to attach a plurality of scraper members to a support member in a manner such that the scraper members collective span the width of the conveyor belt. Doing so allows the scraper members to be replaced individually as they become overly worn. However, doing so in some cases also presents some disadvantages compared to using a larger single scraper member that itself spans the width of the conveyor belt. For example, the scraper members tend to move independently of each other and are therefor effectively less stiff than a longer scraper blade. As such, the use of a plurality of scraper members can be less effective in removing bulk material from a conveyor belt.

SUMMARY OF THE INVENTION

A bulk material conveyor belt scraper assembly in accordance with the invention includes a clamping device that clamps the scraping members of the belt scraper assembly together in a manner such that the scraping members effectively function as a single larger scraping member.

In one aspect of the invention, a bulk material conveyor belt scraper assembly is adapted and configured to clean a bulk material conveyor belt and comprises a support member, at least two scraper members, and a clamping device. The support member has a length that extends along an axis. The scraper members each have a first end portion and an opposite second end portion. The first end portion of each of the scraper members is configured and adapted to engage a bulk material conveyor belt. The second end portion of each of the scraper members connects the scraper member to the support member in a manner such that the scraper member is slidable relative to the support member along the axis of the support member and is otherwise fixed relative to the support member. The clamping device is secured to the support member and is configured and adapted to squeeze the scraper members toward each other relative to the axis of the support member.

In another aspect of the invention, a method of installing scraper members onto a bulk material conveyor belt scraper assembly comprises installing at least a portion of a scraper member onto a support member. There is at least one other scraper member installed on the support member. The support member has a length that extends along an axis. The scraper members initially are slidable relative to the support member along the axis of the support member and are otherwise fixed relative to the support member during the installation. The method also comprises using a clamping device that is attached to the support member in a manner such that the clamping member squeezes the scraper members toward each other relative to the axis of the support member.

Further features and advantages of the present invention, as well as the operation of the invention, are described in detail below with reference to the accompanying drawings.

Figure 1:
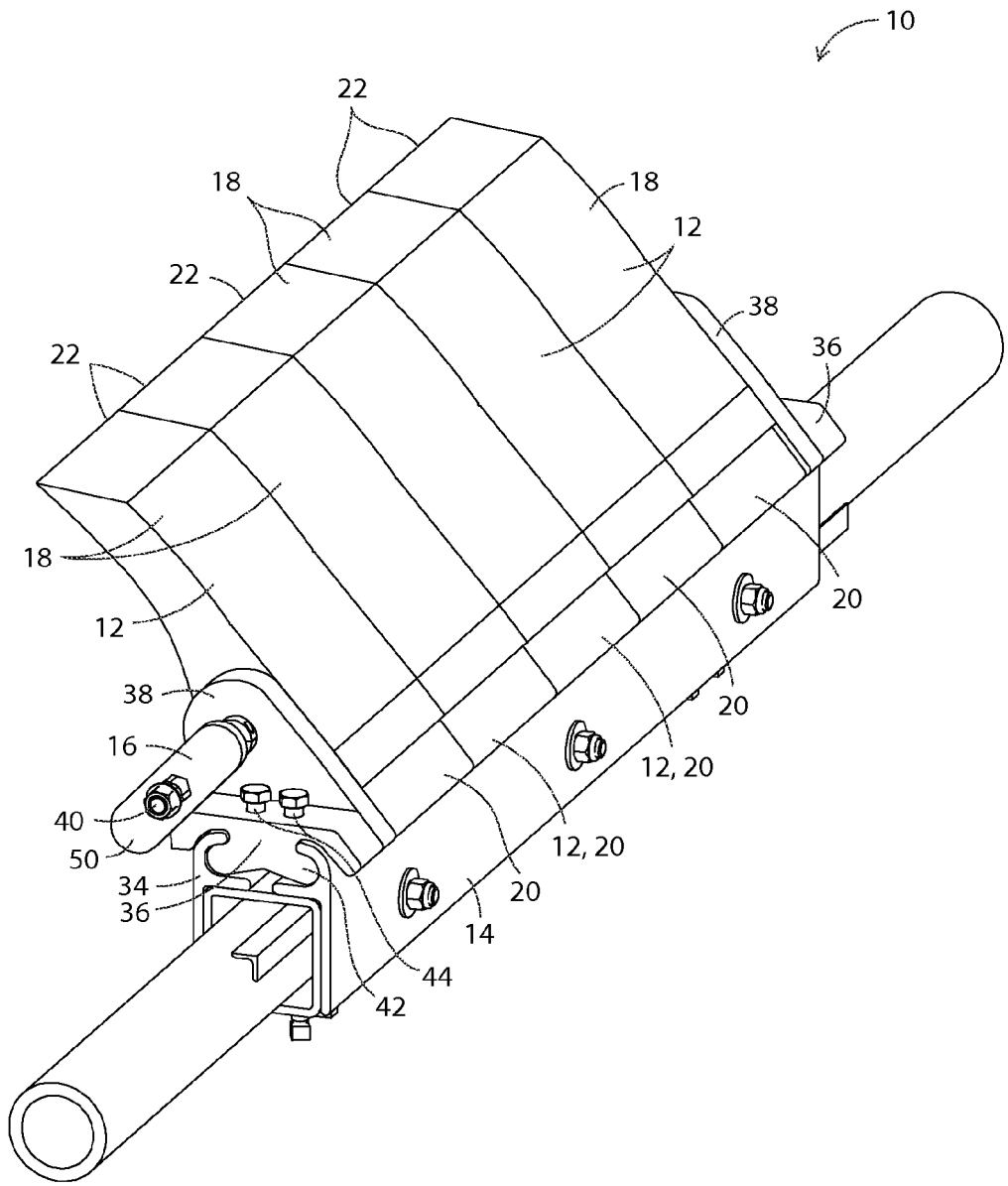
FIG. 1 depicts a perspective view of a belt scraper assembly in accordance with the invention.
Figure 2:
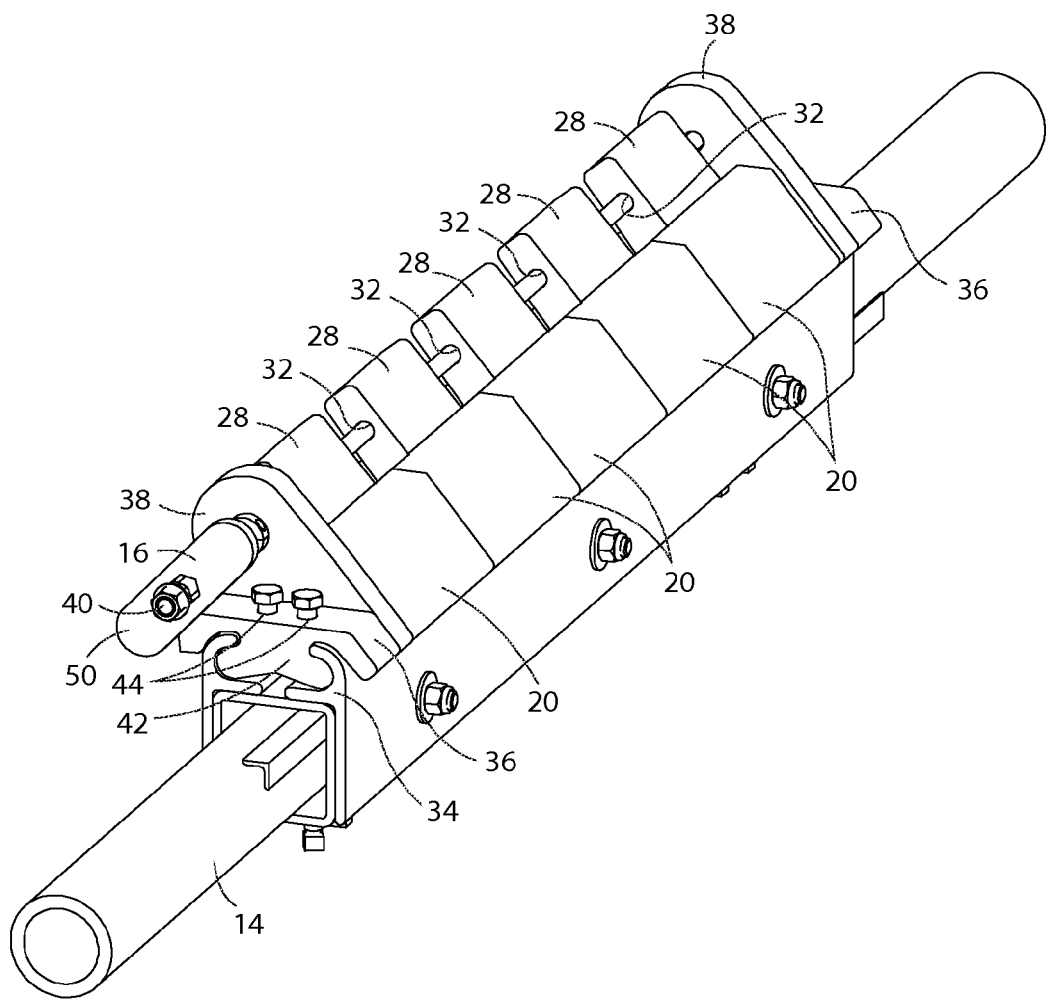
FIG. 2 depicts the belt scraper assembly shown in FIG. 1 with the replaceable tip portions of the scraper members omitted to show the clamping shaft extending through the attachment portions of the scraper members.

Reference numerals in the written specification and in the drawing figures indicate corresponding items.

DETAILED DESCRIPTION

An embodiment of the invention is shown in FIG. 1. The scraper assembly 10 comprises a plurality of scraper members 12, a support member 14, and a clamping device 16. Each of the scraping members 12 is preferably a multipart scraper comprising a tip portion 18 and an base portion 20. The tip portion 18 is preferably formed out of polymeric material and has a scraping edge 22 that is configured and adapted to engage a moving conveyor belt in manner such that bulk material sticking to the conveyor belt is dislodged by the scraper member 12. At its opposite end, the tip portion 18 comprises a cavity 24. A cylindrical hole 26 extends completely through the tip portion 18, included through the cavity 24.

Figure 3:
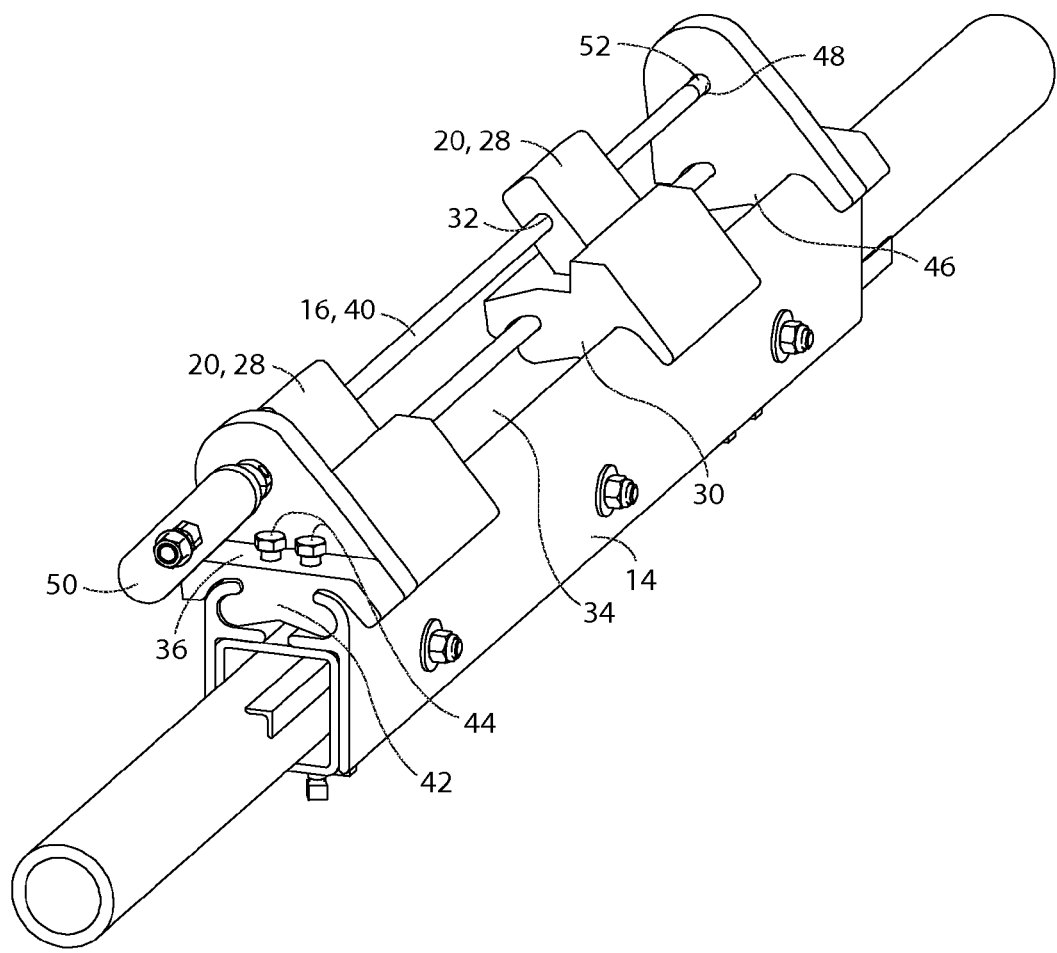
FIG. 3 depicts the belt scraper assembly shown in FIG. 1 with the replaceable tip portions and a few of the attachment portions of the scraper members omitted to show the interlocking nature of the attachment portions and the support member.
Figure 4:
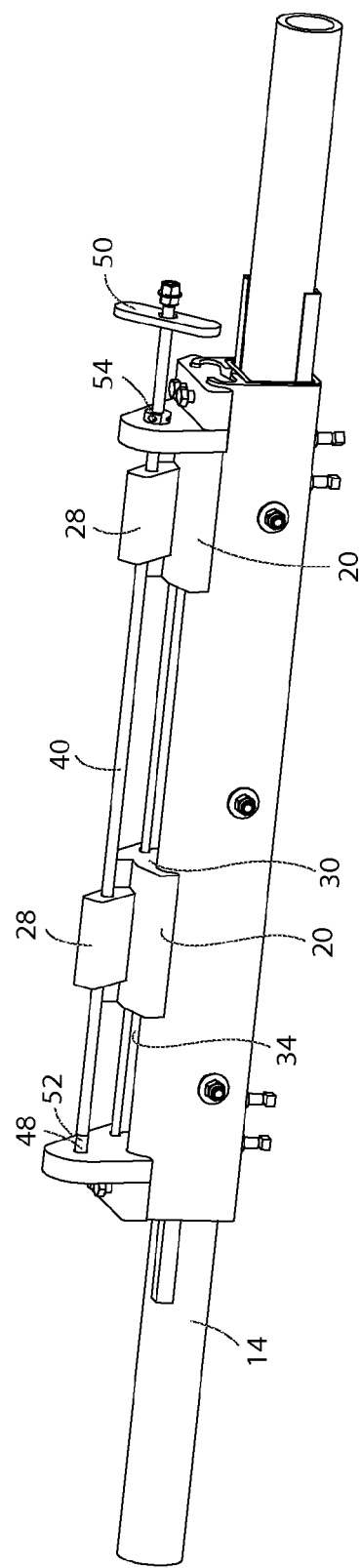
FIG. 4 is a perspective view that is similar to what is shown in FIG. 3, but depicts the assembly from the opposite side.
Figure 5:
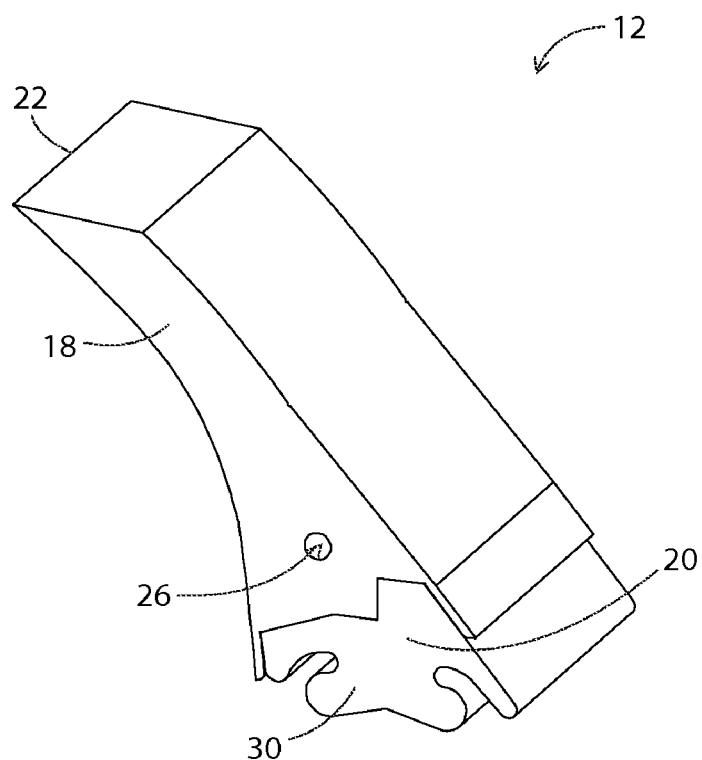
FIG. 5 is a perspective view of one of the scraper members.
Figure 6:
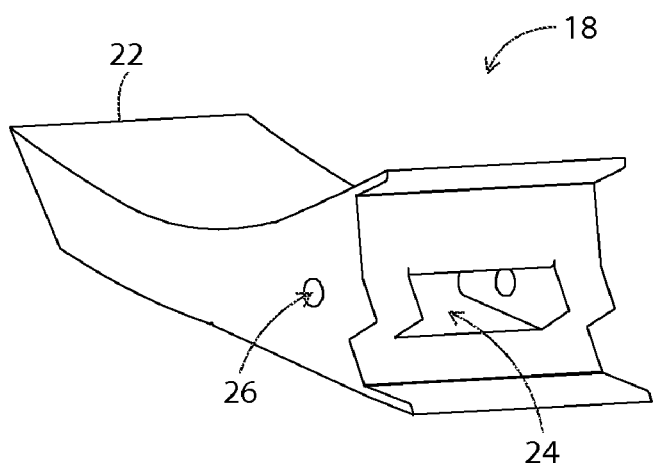
FIG. 6 is a perspective view of the tip portion of one of the scraper members, showing its cavity.

The base portion 20 of each scraper member 12 is also preferably formed of polymeric material (although it too could also be formed of other materials). The base portion 20 comprises a protuberance 28 that is similar in shape and size to the cavity 24 of the tip portion 18 and is configured to mate with the cavity. The opposite end of the base portion 20 comprises a attachment portion 30 (see FIG. 3). A cylindrical hole 32 extends through the protuberance 28 of the base portion 20 and is configured to be aligned with the cylindrical hole 26 of the tip portion 18 when the protuberance and cavity 24 of the tip portion 18 are mated to each other.

The support member 14 extends along an axis and comprises a track or rail 34. The support member 14 is configured to urge the scraper members 12 into engagement with the conveyor belt (by rotating, translating, or doing both). The track 34 is configured and adapted to interlock with the attachment portion 30 of the base portion 20 of each scraper member 12 in a manner such that the base portion can only move linearly along the axis of the support member 14 relative to the support member.

The clamping device 16 comprises two retaining members 36, two end plates 38 and a shaft 40. Each retaining member 36 comprises and attachment portion 42 that is similar in shape to the attachment portions 30 of the scraper members 12 and that is configured to interlock with the track 34 of the support member 14 in a similar manner. Each retaining member 36 also comprises at least one threaded hole into which a locking bolt 44 extends. The locking bolt 44 is configured to engage the track 34 of the support member 14 in a manner locking the retaining member 36 in position along the axis of the support member. Each of the end plates 38 also comprises a similar attachment portion 46 and includes a hole 48 that extends through its opposite end. One of the end plates 38 preferably comprises female threads. The shaft 40 comprises a handle 50 and, at its opposite end, a threaded portion 52. A clamp-on collar 54 is attached to the shaft 40 between the handle 50 and the threaded portion 52 (much closer to the handle).

The scraper assembly 10 is assembled by interlocking respective attachment portions of the scraper members 12, of the end plates 38, and of the retaining members 36 with the track 34 of the support member 14. This is done with the base portions 20 of the scraper members 12 collectively being between the end plates 38, which are between the retaining members 36. The tip portions 18 of the scraper members 12 are then attached to the base portions 20 of the scraper members by inserting the protuberance 28 of each base portion into the cavity 24 of one of the tip portions. The shaft 40 can then be inserted through the hole 48 of one of the end plates 38, through the cylindrical hole 26 of the tip portion 18 and the cylindrical hole 32 of the base portion 20 of each of the scraping members 12, and into the hole of the other end plate (which is the threaded end plate). The threaded portion 52 of the shaft 40 is then threaded into the hole 48 of the threaded end plate 38 by turning the shaft via its handle 50. Eventually the collar 54 on the shaft 40 engages the opposite end plate 38 and thereby draws the end plates toward each other as the shaft becomes tensioned. This also compresses the scraper members 12 against each other, thereby clamping them together. Preferably after this is done, the retaining members 36 are slid along the track 34 tightly against the end plates 38 where they are then locked in position relative to the track via the locking bolts 44, thereby preventing the scraper members 12 and the rest of the clamping device 16 from sliding along the track 34 as a unit.

Throughout the useful life of the scraper assembly 10, the tip portions 18 of the scraper members 12 periodical become overly worn and will be replaced. To replace the tip portion 18 of a scraper member 12, the shaft 40 is unthreaded from the threaded end plate 38 and from the cylindrical hole 26 of the tip portion 18. Once this is done, the tip portion 18 can be removed from the base portion 20 and replacement tip portion can be attached to the base portion.

By clamping the scraper members 12 together, the scraper members effectively perform as a single larger scraper member due to the friction between the scraper members. In other words, as any of the scraper member 12 tries to deflect, the adjacent scraper members will exert resistance to such deflection. It should also be appreciated the shaft 40 is capable of transmitting shear loads between adjacent scraper members 12.

Figure 7:
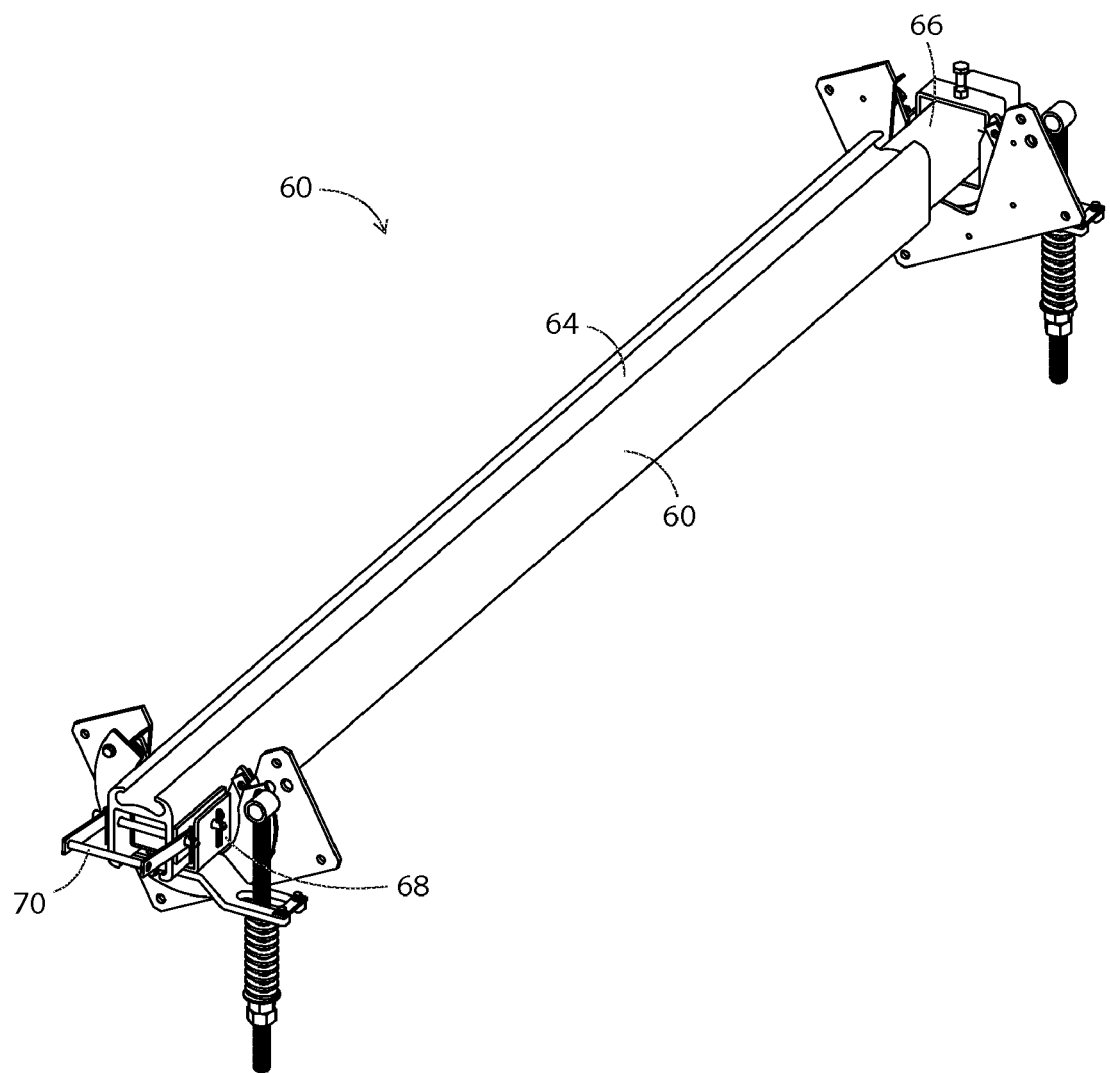
FIG. 7 is a perspective view of an alternative support structure having a slidable support track.
Figure 8:
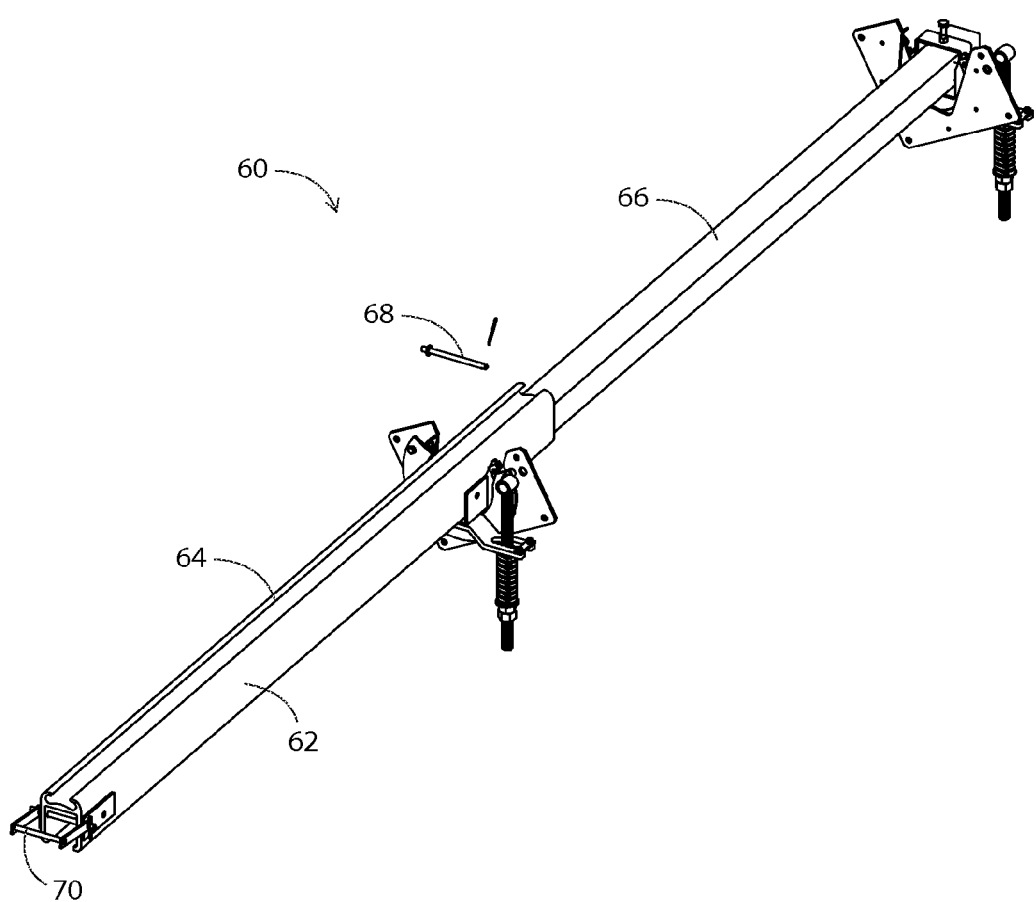
FIG. 8 is a perspective view of the support structure shown in FIG. 7, depicting the support track slid-out relative to the support beam.

FIGS. 7 and 8 depict a slightly different support system 60. The support system 60 comprises a first support member 62 that, like the support member described above, comprises a track 64 onto which the other components of the scraper assembly 10 can be mounted. The support system also comprises a second support member 66. The first support member 62 straddles the second support member 66 and is configured to selectively slide axially along the second support member when unlocked. A locking pin 68 can be inserted through both the first support member 62 and the second support member 66 to thereby lock the support members together. A handle 70 is attached to the first support member 62. When servicing a scraper assembly having this support system 60, the locking pin 68 can be removed and the first support member 62 (together with the scraper members and clamping device attached thereto) can be slid out via along and relative to the second support member 66 (using the handle, if desired). This allows service personnel to then service the scraper assembly more easily from a side of a conveyor belt assembly.

In view of the foregoing, it should be appreciated that the invention achieves the several advantages over the prior art.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A bulk material conveyor belt scraper assembly adapted and configured to clean a bulk material conveyor belt, the conveyor belt scraper assembly comprising:

a support member having a length that extends along an axis;

at least two scraper members, the scraper members each having a first end portion and an opposite second end portion, the first end portion of each of the scraper members being configured and adapted to engage a bulk material conveyor belt, the second end portion of each of the scraper members connecting said scraper member to the support member in a manner such that the scraper member is slidable relative to the support member along the axis of the support member and is otherwise fixed relative to the support member, each of the scraper members comprising a base portion and a tip portion, the tip portion comprising the first end portion of said scraper member, the base portion comprising the second end portion of said scraper member, the tip portion being removable from the base portion;

a clamping device, the clamping device being secured to the support member and being configured and adapted to squeeze the scraper members toward each other relative to the axis of the support member, the clamping device comprising a shaft that extends parallel to the axis of the support member and that extends through each of the scraper members, the shaft releasably locking the tip portion of each of the scraper members to the base portion of said scraper member.

2. A bulk material conveyor belt scraper assembly in accordance with claim 1 wherein the shaft is under tension and said tension squeezes the scraper members toward each other relative to the axis of the support member.

3. A bulk material conveyor belt scraper assembly in accordance with claim 1 wherein the tip portion of each of the scraper members comprises a cavity and the base portion of said scraper member comprises a protrusion, and the protrusion extends into the cavity of said scraper member.

4. A bulk material conveyor belt scraper assembly in accordance with claim 3 wherein the shaft extends through the tip portion and the base portion of each of the scraper member members.

5. A bulk material conveyor belt scraper assembly in accordance with claim 1 wherein the assembly further comprises a retaining member that is secured to the support member and that prevents the scrapers members from axially sliding freely relative to the support member as a sub-assembly.

6. A material conveyor belt scraper assembly in accordance with claim 1 wherein the support member comprises a track that extends axially along the support member, each of the scraper members comprises an attachment portion, and the attachment portion of each of the scraper members is interlocked with the track in a manner limiting all but axially movement between the attachment portion and the support member.

7. A material conveyor belt scraper assembly in accordance with claim 1 wherein the support member constitutes a first support member, the assembly further comprises a second support member, and the first and second support members are connected to each other in a manner such that the first and second support members are able the slide relative to each other along the axis and are otherwise fixed relative to each other.

8. A method of installing scraper members onto a bulk material conveyor belt scraper assembly, the method comprising:

installing at least a portion of a scraper member onto a support member, there being at least one other scraper member installed on the support member, the portion of the scraper member being a tip portion and said scraper member also comprises a base portion, the tip portion being removable from the base portion and fixed thereto in a manner such that the tip portion and the base portion initially are slidable relative to the support member along the axis of the support member as a single unit, the support member having a length that extends along an axis, the scraper members initially being slidable relative to the support member along the axis of the support member and otherwise fixed relative to the support member during the installation;

using a clamping device that is attached to the support member in a manner such that the clamping member squeezes the scraper members toward each other relative to the axis of the support member, the clamping device comprising a shaft;

extending the shaft through each of the scraper members parallel to the axis of the support member in manner releasably locking the tip portion of the scraper member to the base portion of said scraper member.

9. A method in accordance with claim 8 comprising loading the shaft in tension in a manner such that the tension squeezes the scraper members toward each other relative to the axis of the support member.

10. A method in accordance with claim 8 wherein the tip portion of each of the scraper members comprises a cavity and the base portion of said scraper member comprises a protrusion, and the method comprises inserting the protrusion of said scraper member into the cavity of said scraper member.

11. A method in accordance with claim 8 comprising extending the shaft through the tip portion and the base portion of each of the scraper members.

12. A method in accordance with claim 8 further comprising securing a retaining member to the support member in a manner such that the retaining member prevents the scrapers members from axially sliding freely relative to the support member as a sub-assembly.

13. A method in accordance with claim 8 wherein the support member comprises a track that extends axially along the support member, each of the scraper members comprises an attachment portion, and the method comprises interlocking the attachment portion of each of the scraper members with the track in a manner limiting all but axially movement between the attachment portion and the support member.

14. A method in accordance with claim 8 wherein the support member constitutes a first support member, the assembly further comprises a second support member, the first and second support members are connected to each other, and the method comprises sliding the first and second support members relative to each other along the axis while the first and second support members are otherwise fixed relative to each other.

* * * * *